Aug. 8, 1939.      R. M. DOLE      2,168,440
ANTISKID DEVICE FOR AUTOMOBILES
Filed April 2, 1937
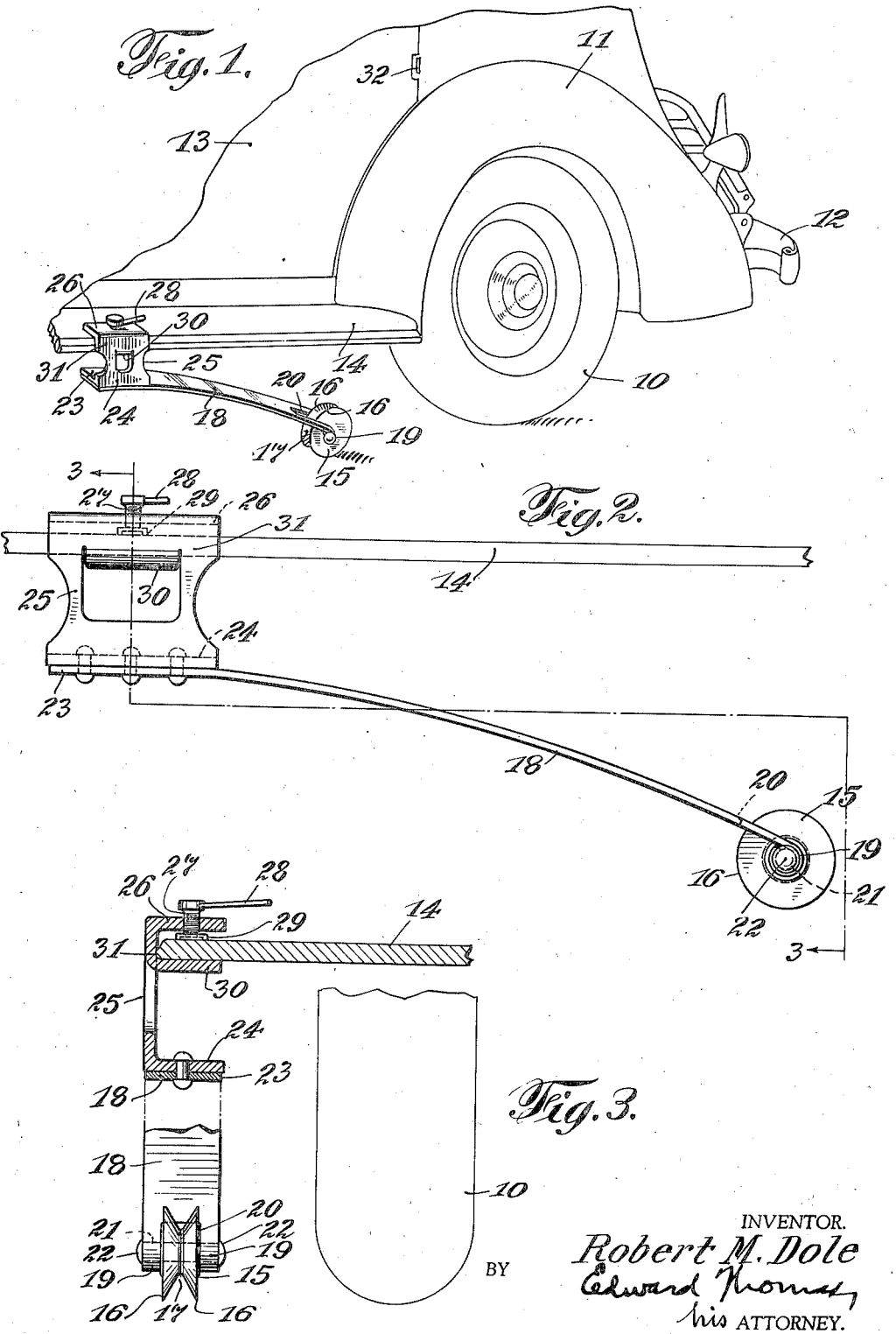
INVENTOR.
Robert M. Dole
BY Edward Thomas
his ATTORNEY.

Patented Aug. 8, 1939

2,168,440

UNITED STATES PATENT OFFICE 2,168,440

ANTISKID DEVICE FOR AUTOMOBILES

Robert M. Dole, Portland, Maine

Application April 2, 1937, Serial No. 134,473

6 Claims. (Cl. 188—5)

This invention relates to anti-skid devices for automobiles and is herein illustrated in the form of a device which is readily attachable to almost any type of automobile, is economical to manufacture, and requires no skill in attaching or using.

In certain parts of the United States automobiles can be driven throughout the year, but winter driving is hazardous on many days because the surface of the roadways is covered with ice, either as the result of rain or snow ice. These days are not actually very numerous but they are sufficiently numerous and put a sufficient handicap on travel to seriously disrupt business and social engagements a number of times each winter. During most of the year, and even during most of the winter, a well designed car has no need for any anti-skid device beyond the usual anti-skid tires.

An anti-skid device, for use on ice, therefore, should be easily detachable, yet quickly applied, when needed, adaptable to carrying in the car when not in use, and yet capable of withstanding the momentarily heavy strains it may be called upon to resist.

According to the present invention a device is provided which meets all these needs and is cheap to construct. In the form shown a roller is attached by a spring to the running board of an automobile, so that the roller serves as a skate runner which cuts into any ice to arrest skidding.

In the accompanying drawing,

Figure 1 is a fragmentary perspective view of an automobile showing the device attached thereto.

Figure 2 is a side view of the device on an enlarged scale.

Figure 3 is a section view on the line 3—3 of Figure 2.

An automobile is shown as having a rear wheel 10, a mud guard 11, fender 12, door 13 and running board 14.

In the form shown skidding is prevented by a wheel 15 having sharpened edges 16 and centrally channelled at 17. Apparently a wheel two and one-half inches in diameter and one inch thick proves most satisfactory.

The wheel 15 is shown near the rear wheel 10 of the automobile and running under the running board 14. To give it the resilient connection needed to keep it firmly on the ice it is shown as held down by a strong flat spring bar 18 provided with journals 19 at opposite sides of the slot 20 in which the wheel 15 runs. The journals are shown as more than semicircular, so that the axle 21 cannot jump out of them. The ends 22 of the axle 21 are shown as headed over to take any side thrust on the wheel.

The spring bar 18 is flat and wide enough to strongly resist any side thrust, and is shown as bolted at its forward end 23 to the flat lower shelf 24 of a clamp or bracket 25, the bracket 25 also including an upper shelf 26 lying above the running board 14.

The upper shelf 26 is threaded to receive the threaded stem 27 which may be turned by a lever arm 28 forcing down a bearing plate 29 on the top of the running board. In the form shown the stem 27 turns on the bearing plate 29 so as to turn easily.

When the lever arm 28 is turned it draws the inturned central lower jaw 30 of the bracket up against the bottom of the running board. If the bracket 25 has been properly placed with its outer web 31 against the edge of the running board 14, it holds the spring bar 18 firmly and thus holds the wheel 15 on the ice under the edge of the running board 14, see Figure 3, so that there is no side thrust on the spring bar 18 unless the car skids.

The bracket 25 is simply constructed by pressing heavy metal so that the lower jaw 30 is cut out of the center of the outer web 31.

For clearness the bracket 25 is shown set so as to bring the anti-skid wheel 15 clear of the automobile rear wheel 10 but the bracket 25 may be set, in many cars almost as far back as the hinge 32 of the door 13, thus placing both wheel 15 and bracket 25 where no one can easily stumble over them. Ordinarily an automobile will carry a wheel 15 under each running board, each carried by a clamp 25 and bar 18, there being a right hand and a left hand clamp.

Having thus described one embodiment of the invention in considerable detail, what is claimed is:

1. An anti-skid device including a wheel having sharp edges to run upon the ground, a clamp adapted to engage the running board of an automobile to hold the wheel to the ground, a wide flat spring bar fast to the clamp adapted to extend rearwardly and toward the ground, and journals at the rear end of the bar to carry the wheel so that the thrust of the spring upon the running board holds the wheel to the ground.

2. An anti-skid device including a clamp having a lower jaw to fit beneath the running board of an automobile, a jaw adapted to be clamped down upon the running board, a shelf below the lower jaw, a rearwardly extending spring bar fast to the shelf, and an anti-skid wheel journalled at the rear of the bar.

3. An anti-skid device including a clamp having a lower jaw to fit beneath the running board of an automobile, a jaw adapted to be clamped down upon the running board, a shelf below the lower jaw, a rearwardly extending spring bar fast to the shelf, and an anti-skid wheel having a channeled face with sharp edges journalled at the rear of the bar.

4. An anti-skid device for automobiles including a wheel with sharp edges, and a resilient support for the wheel adapted to hold it to the ground close to the rear wheel of the automobile but outside of it and substantially in the same axial line.

5. An anti-skid device for automobiles including a wheel with a channel face and sharp edges at each side of the channel, and a resilient support for the wheel adapted to hold it to the ground close to the rear wheel of the automobile but outside of it and substantially in the same axial line.

6. An anti-skid device for automobiles having running boards including a sharp edged wheel to run upon the ground, a resilient support for the wheel to hold it against the ground, and means for holding it to the running board and adapted to be adjusted to shift the wheel backwardly and forwardly along the running board.

ROBERT M. DOLE.